Oct. 22, 1957     A. CHESHKO     2,810,436

APPARATUS FOR CUTTING STRANDS

Filed Sept. 1, 1955

INVENTOR
ANATOLY CHESHKO
BY
ATTORNEY

2,810,436

APPARATUS FOR CUTTING STRANDS

Anatoly Cheshko, Ozone Park, N. Y., assignor to Western Electric Company, Incorporated, New York, N. Y., a corporation of New York Application September 1, 1955, Serial No. 531,981

2 Claims. (Cl. 164—42)

This invention relates to apparatus for cutting strands and more particularly to apparatus for cutting wires between reels of a continuous takeup mechanism.

Various types of cutters have been designed for continuous takeup mechanisms but they have been, for the most part, single cutting elements to bring about a combine cutting-breaking action.

The object of the present invention is a more efficient cutting apparatus for successive strands moved laterally in a given path under a predetermined pressure.

With this and other objects in view, the invention comprises cutting elements carried by a support adjacent the path of successive strands, actuable by strands to cut them.

More specifically, the apparatus includes a support disposed adjacent a given path through which successive strands or wires are moved laterally under a predetermined pressure. First and second cutting elements, having cutting edges disposed adjacent like ends thereof and means operatively connecting the other ends thereof, are supported by out-of-line pivots carried by the supports to cause the elements normally to be in open positions with the cutting edges of the first element traversing said path whereby rocking movement of the first element about its pivot a given distance, by the strands, will cause movement of the cutting edge of the second cutting element a greater distance across said path to cooperate with the cutting edge of the first element to cut the successive strands.

Other objects and advantages will be apparent from the following detailed description when considered in conjunction with the accompanying drawing, wherein.

Figure 1:
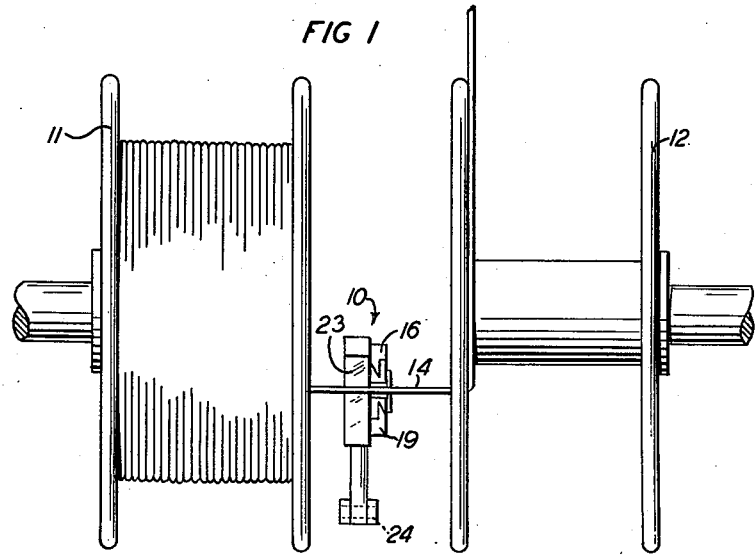
Fig. 1 is a front elevational view of the cutting apparatus disposed between two takeup reels of a continuous takeup mechanism.
Figure 2:
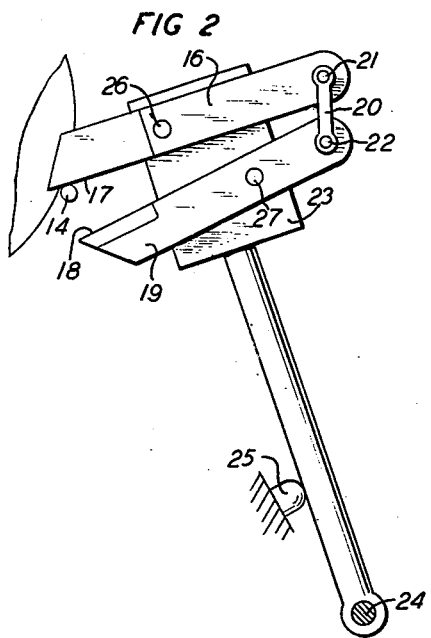
Fig. 2 is a side elevational view of the apparatus with the cutting element shown in open position.

Referring now to the drawing, attention is directed to Fig. 1 where the apparatus indicated generally at 10 is disposed adjacent a filled takeup reel 11 and an empty reel 12 illustrating the strand or wire 14 immediately after it has been transferred from the filled reel to the empty reel. In continuous takeup machines, suitable means (not shown) are provided adjacent the inner heads of the takeup reels, rotatably driven with the reels and having strand engaging notches or fingers to grippingly engage the ends of the portion of the strand or wire 14 extending between the reels. These features are well known in the art, serve to secure the ends of this lateral portion of the wire taut for cutting, to secure the leading end of the cut wire for the filled reel 11 and the trailing end of the cut wire for the empty reel 12. Therefore, the successive portions 14 of the strand or wire passing between the reels 11 and 12 are moved laterally under given like forces during simultaneous rotation of the takeup reels.

The cutting apparatus was designed to utilize the force applied to or embodied in each of the successive strands or wires to operate the cutting apparatus to cut the wires.

The cutting apparatus includes a first cutting element 16 having a cutting edge 17 adapted to cooperate with a cutting edge 18 of a second cutting element 19. The other ends of the cutting elements 16 and 19 are operatively connected to each other by links 20 (only one of which is shown) having their ends supported by pins 21 and 22 extending through the adjacent ends of the elements. A support 23 pivotally mounted at 24, rests normally against a stop 25 which may be adjustable, if desired, to control the positions of the cutting elements relative to the path of the successive strands. Pivots 26 and 27 for the cutting elements 16 and 19 respectively, are disposed out of alignment with each other to accomplish certain purposes. By positioning the pivot 27 for the element 19 nearer the link 20 and the pivot 26 for the element 16 nearer its cutting edge 17, the second cutting element 19 normally will hold the cutting elements in the open position shown, with the cutting edge 17 of the first cutting element extending transversely of the path of the strand portion 14. Furthermore, this arrangement of pivots 26 and 27 make its possible for a short rocking motion of the first cutting element 16 by the successive strands 14 to impart, through the operative connection 20, a far greater motion to the cutting element 19 to close the cutting elements or move them into the position shown in Fig. 3 to cut the strand.

Figure 3:
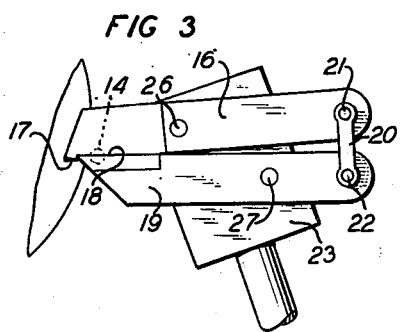
Fig. 3 is a fragmentary side elevational view of the apparatus with the cutting elements shown in closed positions.

During the normal operation of the continuous takeup mechanism, the cutting apparatus remains idle until either reel 11 or 12 is filled and the conventional distributor is moved from the filled reel to the empty reel to transfer the strand and cause a portion thereof to extend transversely of the inner heads of the reels. This strand portion moves laterally in a given path where, before it completes one cycle, it will engage the edge 17 of the first cutting element 16. The force exerted by the taut moving strand will rock the cutting element about its pivot 26 at a given speed, causing the connecting means or links 20 to rock the second element 19 at a greater speed about its pivot 27 to move the cutting edge 18 across the path of the strand and, by doing so, causing cooperation of the cutting edges 17 and 18 to cut the strand as shown in Fig. 3. The cutting apparatus, therefore, requires no external actuating means. The actuating force is derived from the successive strands it is to cut and the efficiency of the apparatus is enhanced by the arrangement of the pivotal supports for the cutting elements, the connecting means between the cutting elements and the association of the cutting edges which require only the force inherent in each strand to bring about this efficient operation.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for cutting strands movable successively laterally in a predetermined path, at a given rate of speed and under a predetermined force, which apparatus comprises a support disposed adjacent to said path, a first cutting element provided with a cutting edge and mounted pivotally on the support, said first cutting element extending transversely of said path whereby each strand will engage said cutting edge and force the cutting element to rotate about its pivot, a second cutting element provided with a cutting edge and mounted pivotally on the support, said second cutting element, prior to the engagement of a strand with the cutting edge of the first cutting element, being disposed out of the path of said strand, and means movable by said rotational movement of the first cutting element to rotate the second cutting element at a tangential speed at its cutting edge faster than the common tangential speed of the strand and the cutting edge of the first cutting element to cause the cutting edge of the second cutting element to overtake the strand and cooperate with the cutting edge of the first cutting element to cut said strand.

2. An apparatus for cutting strands movable laterally successively in a path, at a given speed and under a predetermined force, the apparatus comprising a support disposed adjacent to the path, first and second cutting elements having cutting edges disposed at adjacent ends thereof nearest the path and a link with its ends pivotally connected to the ends of the cutting elements farthest from the path, a pivot carried by the support to support the first cutting element adjacent its cutting edge for rotation about the axis of its pivot and to position the cutting edge of the first cutting element transversely of the path to engage each strand, and a pivot carried by the support to support the second cutting element nearer the link than the pivot of the first cutting element for rotation about the axis of its pivot and to position the cutting edge of the second cutting element out of said path prior to the engagement of each strand with the cutting edge of the first cutting element, the positions of the axes relative to the link connection of the cutting elements resulting in each rotary motion imparted to the first cutting element by a strand causing a faster rotary motion of the second cutting element until its cutting edge overtakes the cutting edge of the first cutting element and cooperates therewith in cutting the strand.

References Cited in the file of this patent

UNITED STATES PATENTS

| | | |
|---|---|---|
| 270,646 | Edenborn et al. | Jan. 16, 1883 |
| 1,027,510 | Stiggins | May 28, 1912 |
| 1,462,197 | Fellroth | July 17, 1923 |
| 1,924,012 | Zinselmeyer | Aug. 22, 1933 |
| 2,287,517 | Euring | June 23, 1942 |
| 2,413,511 | Lucio | Dec. 31, 1946 |
| 2,546,435 | Fine | Mar. 27, 1951 |

FOREIGN PATENTS

| | | |
|---|---|---|
| 284,782 | Germany | June 5, 1915 |